July 12, 1927.
J. E. WILLIAMS
COTTON BLOCKER
Filed July 27, 1926
1,635,521
2 Sheets-Sheet 1
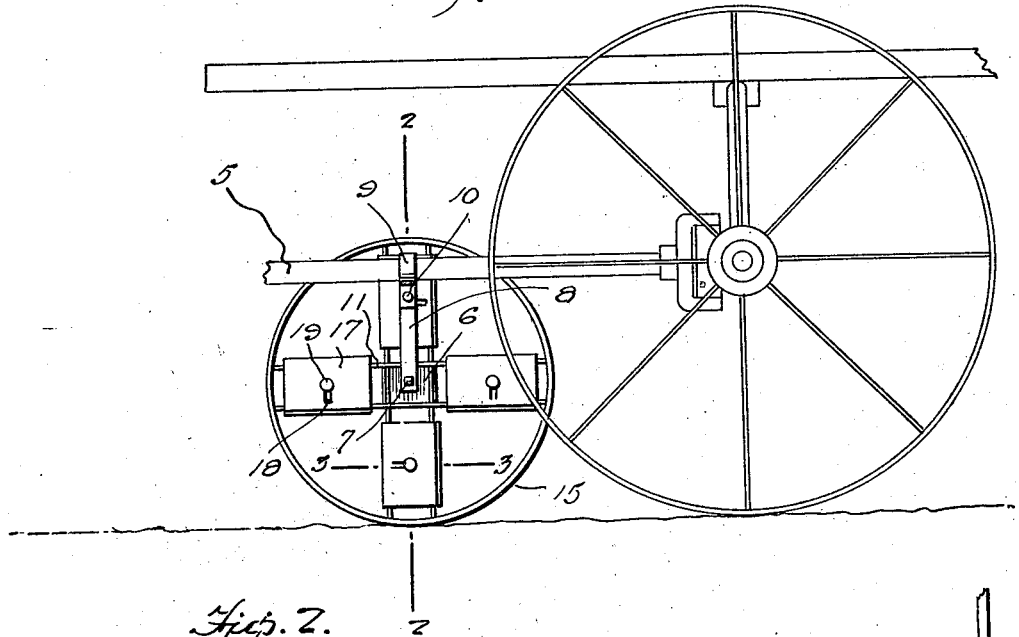
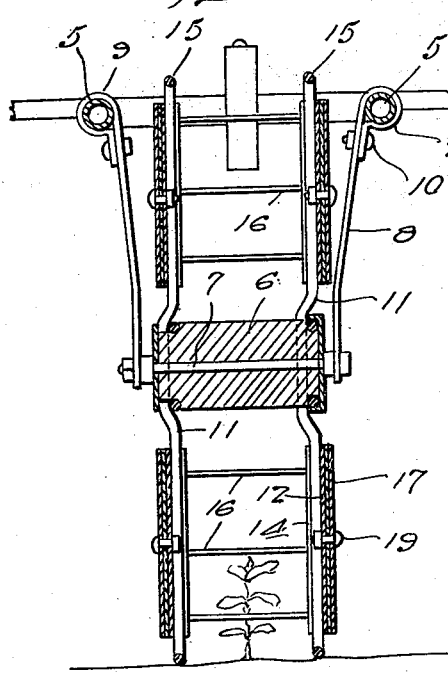
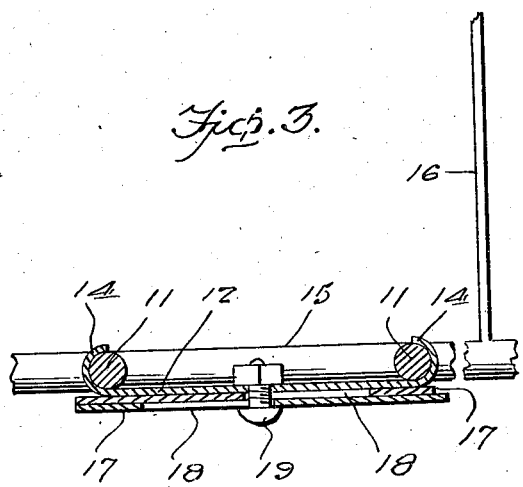
Inventor
J. E. Williams
By Clarence A. O'Brien
Attorney July 12, 1927.
J. E. WILLIAMS
COTTON BLOCKER
Filed July 27, 1926
1,635,521
2 Sheets-Sheet 2
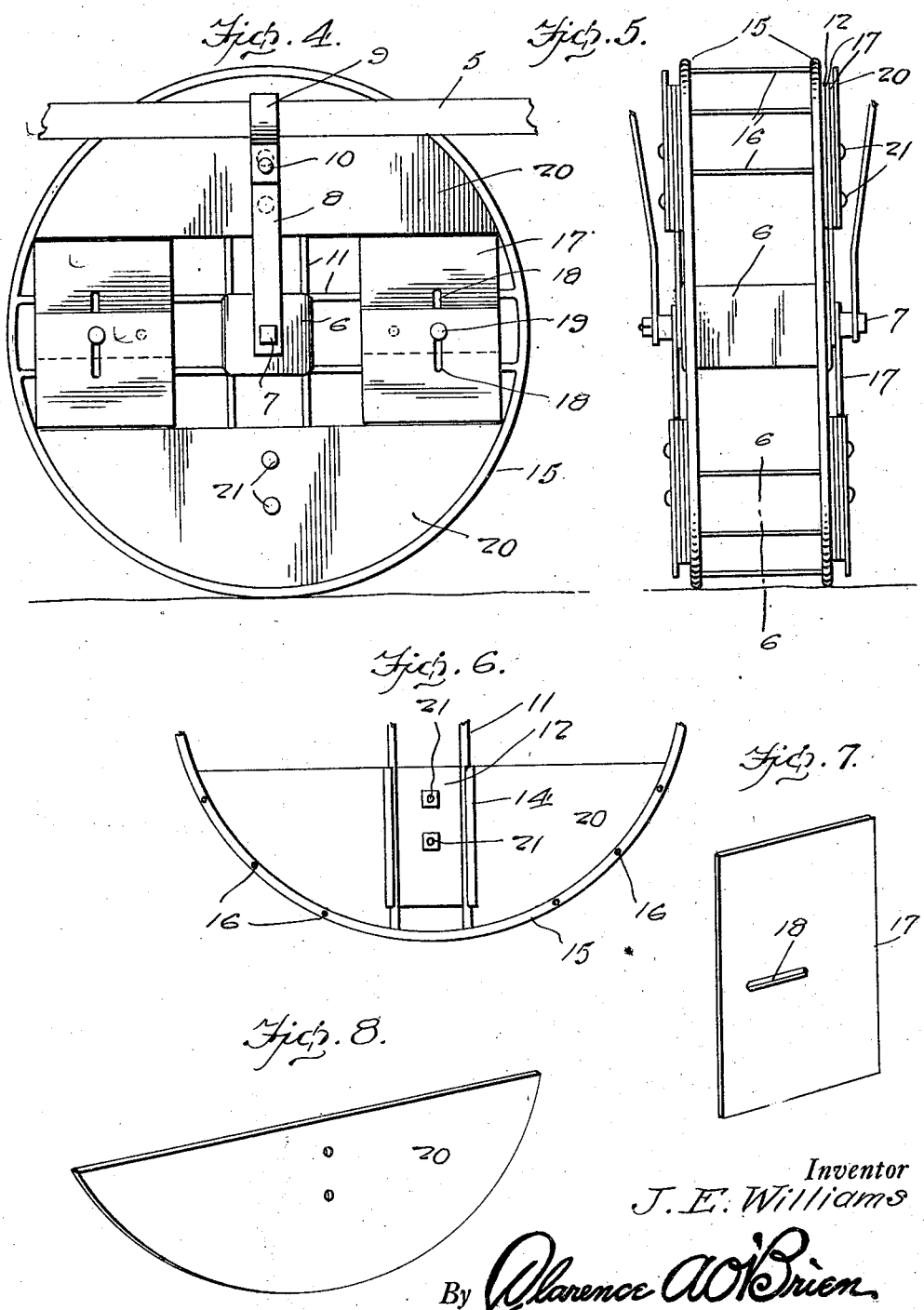
Inventor
J. E. Williams
By Clarence A. O'Brien
Attorney Patented July 12, 1927.

1,635,521

UNITED STATES PATENT OFFICE.

JOHN ELISHA WILLIAMS, OF LONGWORTH, TEXAS.

COTTON BLOCKER.

Application filed July 27, 1926. Serial No. 125,262.

It is now the common practice to chop young cotton plants so that where the plants are too numerous and too close together, they are removed to promote the growth and propagation of the plants. This work is necessarily expensive and slow and often rendered practically impossible of performance because of scarcity of labor.

It has been established that covering up the cotton with dirt will have the same effect as chopping it out and my invention has to do with the covering of the cotton plants so as to leave only those exposed which it is desired to cultivate.

The present invention has to do with the provision of means adapted to be attached to a cultivator, a go-devil or the like, and arranged to protect the plants at spaced intervals from being covered up by the soil which is thrown up by the cultivator or the like.

The invention also includes means for mashing down the plants except where a stand is desired.

In carrying out the invention, I mount a revolving member between the cultivator beams exactly between the front shovels. The device includes radial fenders which are adjustable as to their width and as to their distance from the center of the revolving member. When the fenders reach a perpendicular position between the axis of the device and the ground, they protect the plants from the soil which is being thrown up by the cultivator shovels, thus leaving a stand. I also provide additional fenders which may be used when it is desired to exclude the dirt altogether from the cotton plants.

The invention will be more readily understood from a reading of the following specification and by reference to the accompanying drawings, in which an example of the invention is shown, and wherein:—

Figure 1 is a side elevation of a portion of a cultivator equipped with a device constructed in accordance with my invention, Fig. 2 is a vertical transverse section therethrough, taken substantially on the line 2—2 of Fig. 1, Fig. 3 is a horizontal section taken substantially on the line 3—3 of Fig. 1, Fig. 4 is a side elevation of the device with additional fenders attached thereto, Fig. 5 is an edge elevation of the structure shown in Fig. 4, Fig. 6 is a sectional view taken substantially on the line 6—6 of Fig. 5, Fig. 7 is a perspective view of one of the fender plates, and Fig. 8 is a perspective view of one of the attachment fenders.

Referring to the drawing in detail, it will be seen that numerals 5 denote the beams of an ordinary cultivator, on which are disposed the usual cultivator shovels, (not shown). My attachment is engaged on these beams 5 exactly between the two front shovels in an obvious manner. The numeral 6 denotes a hub with an axle 7 extending therethrough and journaled in the lower ends of brackets 8, the upper ends of which are coiled about the beams 5 as is indicated at 9, being held in place by bolts 10 or in any other suitable fastening elements.

Four spokes 11 are mounted in any suitable manner on each end of the hub 6 and are arranged in pairs, the two pairs at each end of the hub being disposed at right angles to each other, while the spokes in each pair are disposed in parallelism. A plurality of fenders 12 have curved edges 14 for slidably engaging the spokes 11, it being noted that two fenders 12 are associated with each pair of spokes 11. Rim rings 15 are fixed on the ends of the spokes. These two rings 15 are spaced from each other so that a row of cotton may be disposed therebetween as the attachment passes thereover.

At spaced intervals, cross wires or the like 16 are arranged between the rings 15 and aid in mashing down the undesirable plants and weeds. It is to be noted, particularly in Fig. 5, that these wires 16 are spaced comparatively far apart at regular intervals adjacent the fenders 12, where a stand will be made when said fenders are between the axis of the attachment and the ground in a perpendicular position.

In order to widen the fenders 12, I provide thereon a pair of plates 17 provided with slots 18 for receiving bolts 19 piercing the fenders 12. Obviously, these plates 17 may be extended so as to increase the effective width of the fenders 12 as is illustrated in Fig. 4. Thus the size of the stand in each case may be regulated.

The numerals 20 denote auxiliary fenders of a substantial crescent shape. There will be four of these auxiliary fenders furnished with each of the attachments. These auxiliary fenders 20 are engaged on four of the fenders 12 by bolts 21 and when used, the plates of the other four fenders will be spread apart, thereby forming continuous fenders about the attachment so as to prevent the throwing of any dirt onto the plants, as will be desirable in ordinary cultivation.

It is thought that the construction, operation, and advantages of this invention will now be clearly understood by those skilled in this art without a more detailed description. The present embodiment of the invention has been disclosed in detail merely by way of example, since in actual practice, it attains the features of advantage enumerated as desirable in the statement of the invention and in the above description. Furthermore, this example of the invention is exceedingly simple in its construction, inexpensive to manufacture, strong and durable, easy to adjust, easy to assemble and disassemble, efficient and reliable in operation, and otherwise well adapted to the purpose to which it is designed.

It will be apparent that numerous changes in the details of construction, in the dimensions, and in the combination and arrangement of parts may be resorted to without departing from the spirit or scope of the invention as hereinafter claimed, or sacrificing any of its advantages.

Having thus described my invention, what I claim as new is:—

1. In a blocking device of the character described, a hub member, spokes radiating from the hub member and arranged in pairs, a plurality of fenders having curved edges slidable on the spokes, one fender associated with each pair of spokes, rim rings on the outer ends of the spokes, a pair of plates associated with each fender, means for attaching the plates to the fenders so that they may be spread apart to increase the effective width of the fenders.

2. In a blocking device of the class described, a hub member, a plurality of spokes engaged on each end of the hub member, said spokes being arranged in pairs of fenders on the spokes, one fender to each pair, each fender having curved edges for slidably engaging the spokes, a bolt engaged with each fender, and a pair of plates having slots pierced by said bolt so that the effective width of the fenders may be varied.

In testimony whereof I affix my signature.

JOHN ELISHA WILLIAMS.